United States Patent
Miyoshi et al.

(10) Patent No.: US 11,794,618 B2
(45) Date of Patent: *Oct. 24, 2023

(54) CONVEYANCE SEAT

(71) Applicant: TS TECH CO., LTD., Saitama (JP)

(72) Inventors: Takako Miyoshi, Tochigi (JP); Junichi Takahashi, Tochigi (JP)

(73) Assignee: TS TECH CO., LTD., Saitama (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/896,124

(22) Filed: Aug. 26, 2022

(65) Prior Publication Data

US 2022/0410774 A1   Dec. 29, 2022

Related U.S. Application Data

(63) Continuation of application No. 17/338,755, filed on Jun. 4, 2021, now abandoned, which is a continuation
(Continued)

(30) Foreign Application Priority Data

Mar. 3, 2017   (JP) ................................. 2017-040833

(51) Int. Cl.
   *A47C 7/72* (2006.01)
   *B60N 2/58* (2006.01)
   *B60N 2/56* (2006.01)

(52) U.S. Cl.
   CPC ............. *B60N 2/58* (2013.01); *B60N 2/5642* (2013.01)

(58) Field of Classification Search
   CPC .. B60N 2/5635; B60N 2/5657; B60N 2/5685; B60N 2/5621; B60N 2/5642; B60N 2/565; B60N 2/5628; B60N 2/5692
   See application file for complete search history.

(56) References Cited

U.S. PATENT DOCUMENTS

| | | |
|---|---|---|
| 3,979,487 A | 9/1976 | Squier et al. |
| 5,505,692 A | 4/1996 | Cho |

(Continued)

FOREIGN PATENT DOCUMENTS

| | | |
|---|---|---|
| JP | 2009/292230 A | 12/2009 |
| JP | 2014-236540 A | 12/2014 |

(Continued)

OTHER PUBLICATIONS

International Search Report dated Dec. 26, 2017 for the corresponding PCT Application No. PCT/JP2017/035153, with partial English translation.

(Continued)

*Primary Examiner* — Shin H Kim
(74) *Attorney, Agent, or Firm* — Michael Best & Friedrich LLP

(57) ABSTRACT

Regarding a skin in which pores are formed for passage of a current of air generated by an air blower, the present invention properly ensures strength around the pores. A vehicle seat includes a skin forming a part of a seat body facing an occupant and an air blower attached to the seat body. The skin is provided with a top layer provided on a side of the skin facing the occupant in a thickness direction and a fabric layer provided at a position on a side opposite to the top layer. A plurality of pores allowing passage of a current of air generated by the air blower are formed in both the top layer and the fabric layer. A part of the fabric layer positioned at an edge of the pore is made of a fabric constituted by urethane resin-impregnated fibers being knitted.

8 Claims, 4 Drawing Sheets

Related U.S. Application Data of application No. 16/489,866, filed as application No. PCT/JP2017/035153 on Sep. 28, 2017, now Pat. No. 11,027,632.

(56) References Cited

U.S. PATENT DOCUMENTS

| | | | |
|---|---|---|---|
| 6,179,706 B1 | 1/2001 | Yoshinori et al. | |
| 6,457,777 B1 | 10/2002 | Kazuno et al. | |
| 7,070,232 B2* | 7/2006 | Minegishi | B60N 2/5657 297/452.47 |
| 7,172,246 B1 | 2/2007 | Itakura | |
| 7,275,793 B2* | 10/2007 | Fujita | D04B 21/16 297/452.56 |
| 7,823,980 B2* | 11/2010 | Niwa | B60N 2/58 297/452.61 |
| 7,862,113 B2* | 1/2011 | Knoll | B60N 2/66 297/180.13 |
| 7,866,017 B2* | 1/2011 | Knoll | B60N 2/5635 297/180.16 |
| 7,931,330 B2 | 4/2011 | Itou et al. | |
| 8,646,836 B2* | 2/2014 | Oota | B60N 2/5671 297/180.12 |
| 10,227,024 B2* | 3/2019 | Kageyama | B60N 2/5883 |
| 2003/0134101 A1 | 7/2003 | Kikuchi et al. | |
| 2003/0214160 A1 | 11/2003 | Brennan et al. | |
| 2004/0104607 A1 | 6/2004 | Minegishi et al. | |
| 2004/0145230 A1 | 7/2004 | Fujita et al. | |
| 2007/0176471 A1 | 8/2007 | Knoll | |
| 2009/0146483 A1 | 6/2009 | Niwa et al. | |
| 2009/0322124 A1 | 12/2009 | Barkow et al. | |
| 2011/0187165 A1 | 8/2011 | Oota et al. | |
| 2015/0299944 A1 | 10/2015 | Sugiura et al. | |
| 2016/0375807 A1 | 12/2016 | Kageyama et al. | |
| 2017/0305126 A1 | 10/2017 | Takeshita et al. | |
| 2017/0314894 A1 | 11/2017 | Tunis, III et al. | |
| 2017/0342657 A1 | 11/2017 | Izumi et al. | |
| 2018/0022253 A1 | 1/2018 | Akimoto et al. | |
| 2019/0153666 A1 | 5/2019 | Nakayama et al. | |

FOREIGN PATENT DOCUMENTS

| | | |
|---|---|---|
| JP | 2016-129994 A | 7/2016 |
| JP | 2016-132350 A | 7/2016 |
| WO | 2014/097999 A1 | 6/2014 |
| WO | 2015/022772 A1 | 2/2015 |

OTHER PUBLICATIONS

Japanese Office Action dated Jul. 21, 2020 from the Japan Patent Office (JPO) for the related Japanese patent application No. 2017-040833, with machine English translation.

* cited by examiner

FIG. 4

| | EXAMPLE 1 | EXAMPLE 2 | EXAMPLE 3 | THIS EXAMPLE |
|---|---|---|---|---|
| KNITTING METHOD | SINGLE JERSEY TYPE | DOUBLE JERSEY TYPE | TRICOT | TRICOT |
| FIBER TYPE (THICKNESS) | ONE TYPE (75d/36f) | THREE TYPES (75d/72f, 100d/24f, 75d/36f) | THREE TYPES (50d/72f, 75d/36f, 75d/36f) | THREE TYPES (50d/72f, 75d/36f, 75d/36f) |
| BASIS WEIGHT OF FABRIC | 100g/m² | 330g/m² | 280g/m² | 280g/m² |
| DENSITY OF FABRIC | 30C/28W | 65C/35W | 73C/36W | 73C/36W |
| URETHANE RESIN IMPREGNATION | × | × | × | ○ |
| FRAYING OF FIBERS | PRESENT | PRESENT | PRESENT | ABSENT |

CONVEYANCE SEAT

CROSS-REFERENCE TO RELATED APPLICATIONS

This application is a continuation of U.S. patent application Ser. No. 17/338,755, filed on Jun. 4, 2021, which, in turn, is a continuation of U.S. patent application Ser. No. 16/489,866 (now U.S. Pat. No. 11,027,632), filed on Aug. 29, 2019, which, in turn, is a National Phase Entry of PCT Application No. PCT/JP2017/035153, filed on Sep. 28, 2017. Further, this application claims priority from Japanese Patent Application No. JP 2017-040833, filed on Mar. 3, 2017, the entire contents of which are hereby incorporated by reference.

TECHNICAL FIELD

The present invention relates to a conveyance seat and, particularly, to a conveyance seat in which a skin has a plurality of pores allowing passage of a current of air generated by an air blower attached to a seat body.

BACKGROUND ART

In conveyance seats, there is a conveyance seat capable of sending a current of air to an occupant seated on the seat with an air blower attached to a seat body (see, for example, PATENT LITERATURE 1). In such a conveyance seat, the current of air generated by the air blower reaches the occupant's body through the inside of the seat. Accordingly, in the conveyance seat to which the air blower is attached, a ventilation hole is usually formed with respect to a skin as a seat component.

The skin described in PATENT LITERATURE 2 is an example of skins having ventilation holes. The skin described in PATENT LITERATURE 2 has a base fabric configured to include a fiber having a synthetic resin coating layer. The synthetic resin coating layer of the fiber constituting the base fabric is made of a synthetic resin having a melting point of 120 degrees to 180 degrees. With such a configuration, the skin described in PATENT LITERATURE 2 ensures a sufficient strength as a skin and exhibits a satisfactory ventilation hole appearance. Specifically, it is possible to suppress fraying of fibers (yarns) around a ventilation hole.

CITATION LIST

Patent Literature

PATENT LITERATURE 1: JP 2016-132350 A
PATENT LITERATURE 2: JP 2016-129994 A

SUMMARY OF INVENTION

Technical Problem

According to PATENT LITERATURE 2, the synthetic resin coating layer is formed around core fibers and the fibers are partially fused together for yarn fraying suppression. Manufacturing of the skin described in PATENT LITERATURE 2 requires some time and effort since the fibers are fused together as described above. Accordingly, realization by means of a configuration different from PATENT LITERATURE 2 is desirable with regard to a skin capable of suppressing yarn fraying in a base fabric.

In this regard, the present invention has been made in view of the above problems, and an object thereof is to provide a conveyance seat capable of properly ensuring strength around pores with regard to a skin in which the pores are formed for passage of a current of air generated by an air blower.

Solution to Problem

The above-described object is achieved by a conveyance seat of the present invention including a seat body on which an occupant can sit, a skin forming a part of the seat body facing the occupant, and an air blower attached to the seat body, in which the skin is provided with a top layer provided on a side of the skin facing the occupant in a thickness direction and a fabric layer provided at a position on a side opposite to the top layer, a plurality of pores allowing passage of a current of air generated by the air blower are formed in both the top layer and the fabric layer, and a part of the fabric layer positioned at an edge of the pore is made of a fabric constituted by urethane resin-impregnated fibers being knitted.

In the conveyance seat configured as described above, the plurality of pores for ventilation are formed in both the top layer and the fabric layer of the skin. In addition, the part of the fabric layer positioned at the edge of the pore is made of the fabric constituted by the urethane resin-impregnated fibers being knitted. It is possible to suppress fraying of fibers around the pores by using the fabric constituted by the urethane resin-impregnated fibers being knitted as described above.

In the configuration described above, the fabric layer may be made of a tricot knitted fabric constituted by a plurality of types of fibers being knitted and each of the plurality of types of fibers constituting the fabric layer may be urethane resin-impregnated.

According to the configuration described above, the strength of the fabric layer can be further improved since each of the plurality of types of fibers constituting the fabric layer is urethane resin-impregnated.

In the configuration described above, the top layer may be made of synthetic leather made of polyvinyl chloride.

According to the configuration described above, it is possible to improve the appearance of the skin while ensuring the strength of the fabric layer.

In the configuration described above, it is preferable that the fabric layer has a fabric layer bottom portion provided at a position farthest from the top layer in the thickness direction and a fiber constituting the fabric layer bottom portion is in a raised state.

According to the configuration described above, the fibers constituting the fabric layer bottom portion are in a raised state and the fibers are easily entangled with each other. As a result, fraying of fibers around the pores can be more effectively suppressed.

Advantageous Effects of Invention

According to the conveyance seat of the present invention, it is possible to ensure strength around the pores of the fabric layer in the skin and suppress fraying of fibers around the pores.

In addition, according to the conveyance seat of the present invention, the strength of the fabric layer can be further improved since each of the plurality of types of fibers constituting the fabric layer is urethane resin-impregnated.

In addition, according to the conveyance seat of the present invention, it is possible to improve the appearance of the skin while ensuring the strength of the fabric layer since the top layer is made of synthetic leather made of polyvinyl chloride.

In addition, according to the conveyance seat of the present invention, fraying of fibers around the pores can be more effectively suppressed since the fibers constituting the fabric layer bottom portion are in a raised state and the fibers are easily entangled with each other.

BRIEF DESCRIPTION OF DRAWINGS

FIG. 4 is a diagram illustrating the respective specifications of the skin according to an embodiment of the present invention and skins according to comparative examples.

DESCRIPTION OF EMBODIMENTS

Hereinafter, a conveyance seat according to an embodiment of the present invention (the present embodiment) will be described. Incidentally, the configuration of a seat mounted in a vehicle (hereinafter, vehicle seat S) as an example of the conveyance seat will be described below. The conveyance seat of the present invention is not limited to a vehicle seat and can also be used as a seat mounted in a non-vehicle conveyance (such as a two-wheeled vehicle, a ship, and an aircraft).

Moreover, the embodiment described below is merely an example for facilitating the understanding of the present invention and does not limit the present invention. In other words, the present invention can be modified and improved within the gist of the present invention. It is a matter of course that the present invention includes equivalents of the present invention.

Figure 1:
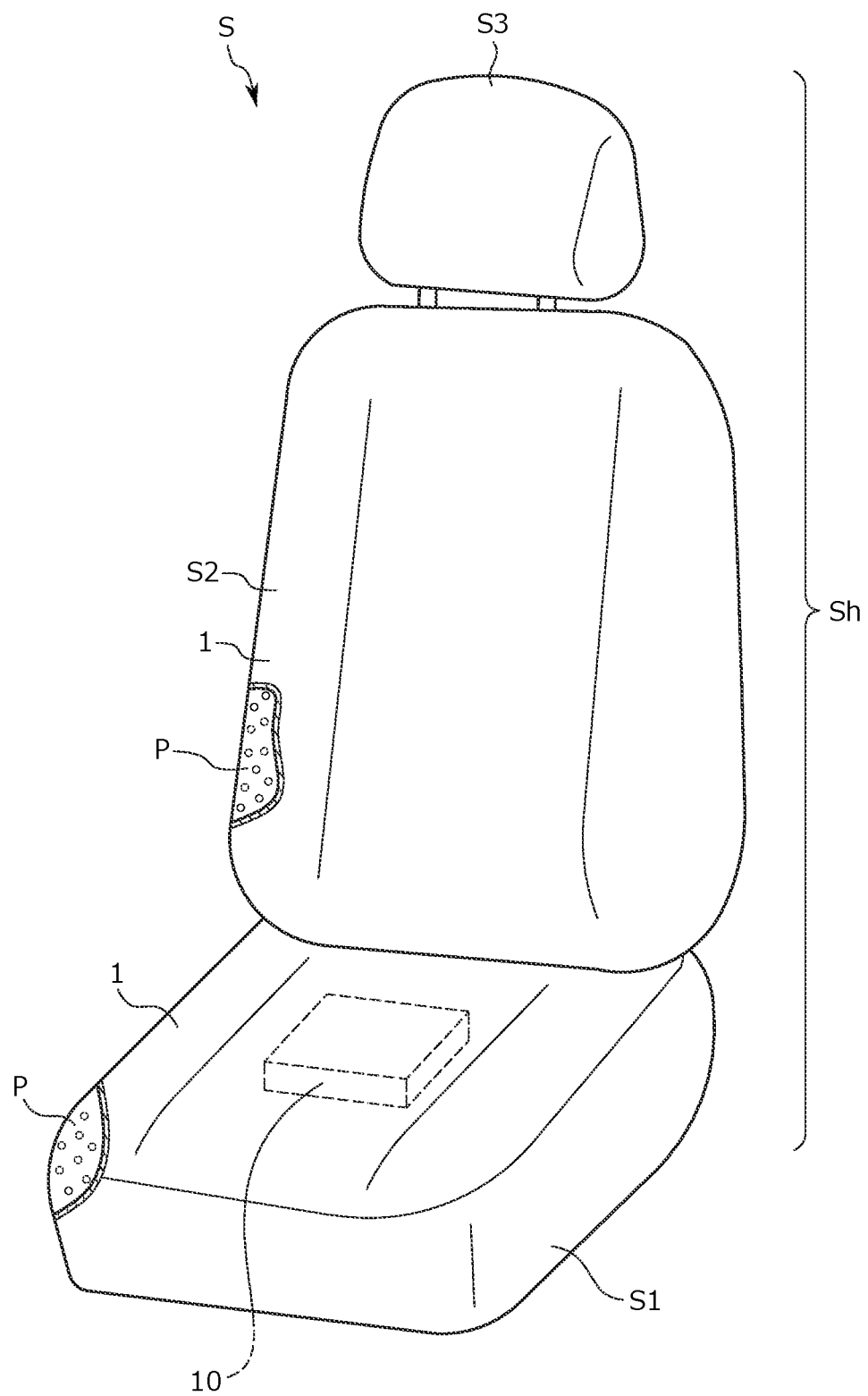
FIG. 1 is an overall view of a conveyance seat according to an embodiment of the present invention.
Figure 2:
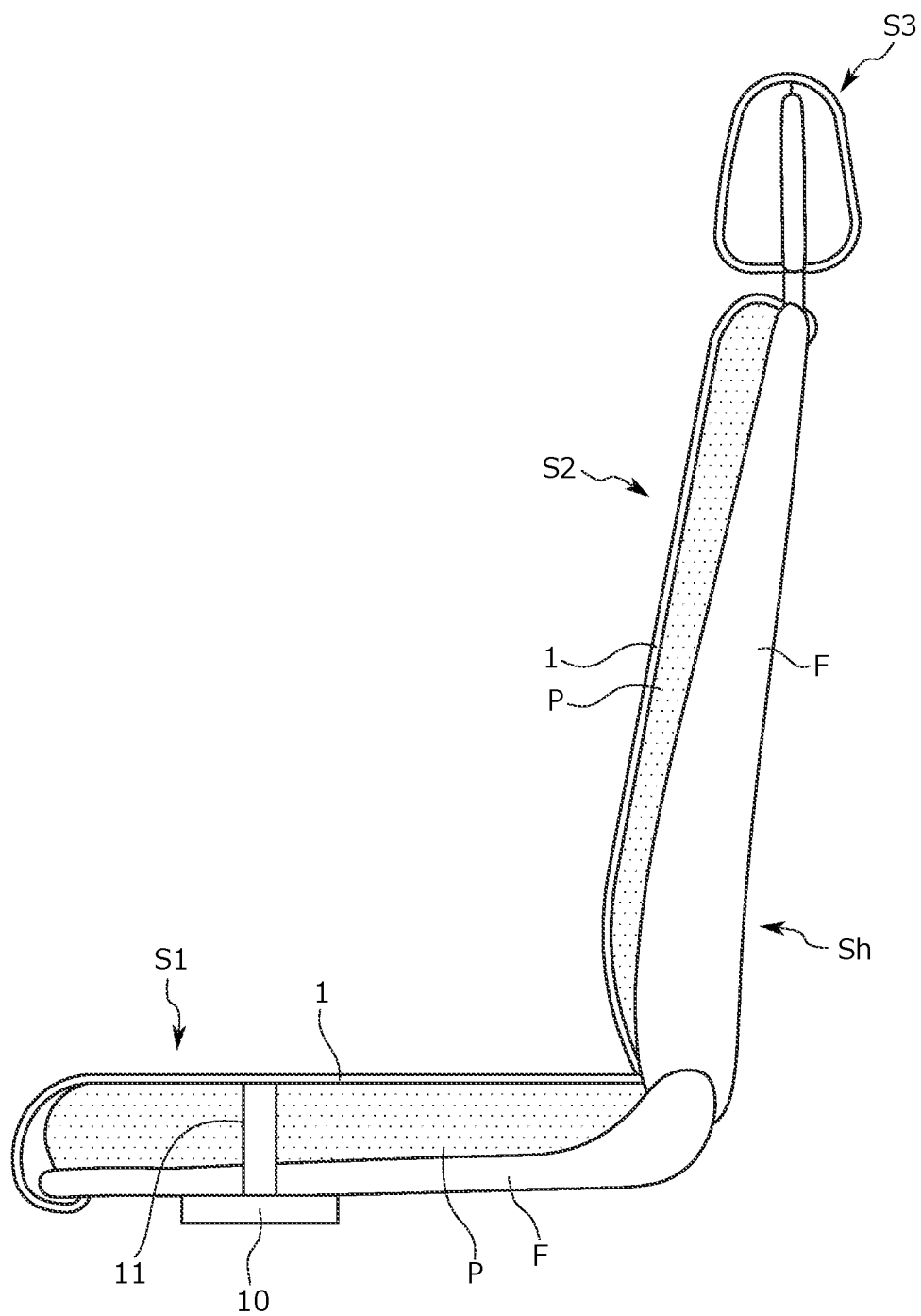
FIG. 2 is a view illustrating an air blower and a seat body of the conveyance seat.

As illustrated in FIGS. 1 and 2, the vehicle seat S has a seat body Sh on which the occupant can sit and an air blower 10 attached to the seat body Sh. The seat body Sh is provided with a seat cushion S1, a seat back S2, and a headrest S3. The seat cushion S1 and the seat back S2 are configured by a cushion pad P being placed on a frame F and the surface of the cushion pad P being covered with a skin 1. The skin 1 is a component constituting each of the seat cushion S1 and the seat back S2. The skin 1 forms the part of the seat body Sh that faces the occupant. Specifically, the skin 1 forms a seating surface.

More specifically, in the seat cushion S1, a part of the skin 1 constitutes the surface that supports from below the buttocks of the occupant seated on the vehicle seat S (that is, the upper surface of the seat cushion S1). In the seat back S2, a part of the skin 1 constitutes the surface that supports from behind the back of the occupant seated on the vehicle seat S (that is, the front surface of the seat back S2).

The air blower 10 is an equipment provided for air conditioning and ventilation. A known blower or the like constitutes the air blower 10. As illustrated in FIG. 2, the air blower 10 is disposed at a lower position of the seat cushion S1.

As for the frame F and the cushion pad P that constitute the seat cushion S1, a through hole is formed at the points of the frame F and the cushion pad P that are positioned above the air blower 10. The through hole forms an air duct 11. Further, a tubular sheet metal material-based duct (not illustrated) may be disposed in the air duct 11.

Figure 3:
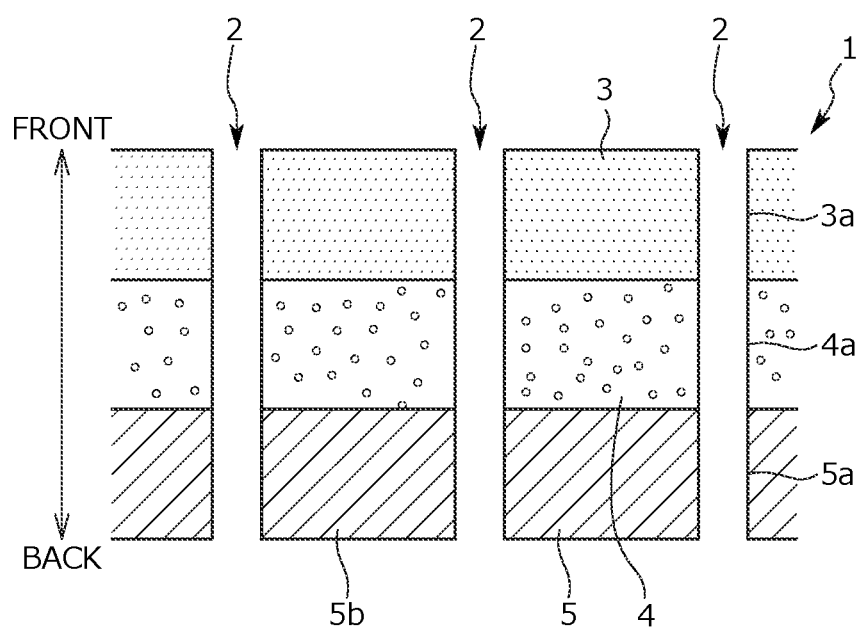
FIG. 3 is a schematic enlarged view illustrating a laminated structure of a skin.

As illustrated in FIG. 3, a plurality of pores 2 penetrating the skin 1 are formed in the skin 1 forming the seating surface. The pore 2 allows passage of a current of air generated by the air blower 10. The pore 2 is formed by a known perforation treatment (boring treatment) being performed on the skin 1.

When the blower forming the air blower 10 rotates forward, the current of air (air flow) from the air blower 10 is sent to the upper side of the seating surface of the seat cushion S1 through the air duct 11 and the pore 2 and hits the occupant (strictly speaking, the occupant's buttocks) seated on the seat cushion S1. When the blower rotates in reverse, the air in the vicinity of the seating surface becomes a current of air and is suctioned into the air blower 10 through the pore 2 and the air duct 11.

Further, although the air blower 10 is attached to the seat cushion S1 in the present embodiment, the present invention is not limited thereto. The air blower 10 may be attached to the seat back S2 (more specifically, the rear portion of the seat back S2).

Next, the structure of the skin 1 will be described with reference to FIG. 3. The skin 1 according to the present embodiment has a laminated structure as illustrated in FIG. 3. Specifically, the skin 1 has a three-layer structure. The layers that constitute the skin 1 are a top layer 3, a foam layer 4, and a fabric layer 5.

The top layer 3 is provided so as to be positioned on the front side (exposed side facing the occupant) in the thickness direction of the skin 1. In the present embodiment, the top layer 3 is made of synthetic leather made of polyvinyl chloride (PVC). The foam layer 4 is adjacent to the top layer 3 in the thickness direction of the skin 1. A known wadding material constitutes the foam layer 4. Further, an adhesive coating film is formed on the boundary surface between the top layer 3 and the foam layer 4 and the top layer 3 is attached to the surface of the foam layer 4.

The fabric layer 5 is provided so as to be positioned on the back side (side opposite to the top layer 3) in the thickness direction of the skin 1. The fabric layer 5 is made of a fabric constituted by fibers being knitted. More specifically, the fabric layer 5 is made of a tricot knitted fabric.

As described above, the skin 1 has the pore 2 formed by a perforation treatment. In other words, a plurality of pores 3a, a plurality of pores 4a, and a plurality of pores 5a respectively penetrating the top layer 3, the foam layer 4, and the fabric layer 5 are formed in the layers (top layer 3, foam layer 4, and fabric layer 5) constituting the skin 1, respectively. It is a matter of course that the pores in the layers communicate with each other and the pores are in a straight line as illustrated in FIG. 3. Each of the pores 3a, 4a, and 5a allows passage of the current of air generated by the air blower 10.

On the other hand, in general, when pores are formed in a fiber knitting-based fabric, the fibers that are positioned around the pores are easily frayed. In the fabric that forms the fabric layer 5 in the skin 1, in contrast, fraying of the fibers around the pore 5a can be effectively suppressed. The configuration of the fabric layer 5 will be described in detail below.

The fabric layer 5 is made of a tricot knitted fabric as described above. Strictly speaking, the fabric layer 5 is made of a fabric constituted by a plurality of types of fibers being knitted. Further, the fabric layer 5 according to the present embodiment is made of a fabric constituted by three types of fibers being knitted. The thickness of each type of fiber is 50 d/72 f, 75 d/36 f, and 75 d/36 f as illustrated in FIG. 4.

FIG. 4 is a diagram illustrating the respective specifications of the skin 1 according to the present embodiment and skins according to comparative examples. The skin 1 according to the present embodiment is described as "this example" in the diagram. Three examples are given as the comparative examples. In the diagram, the examples are described as "Example 1", "Example 2", and "Example 3", respectively.

Each of the three types of fibers constituting the fabric layer 5 is a urethane resin-impregnated fiber. Further, in the present embodiment, the amount of urethane resin impregnation of each fiber is 1 g to 10 g per unit length of the fiber.

The fabric is constituted by the fibers being knitted and the fabric is used as the fabric layer 5. Further, in the present embodiment, the specifications of the fabric forming the fabric layer 5 are 280 g/m² or less in basis weight and 73 C/36 W in density.

A raising treatment is performed on the part that corresponds to a fabric layer bottom portion 5b in the fabric constituted by the fibers being knitted. Accordingly, the fibers constituting the fabric layer bottom portion 5b are in a raised state and the fibers are easily entangled with each other. Here, "fabric layer bottom portion 5b" is the part of the fabric layer 5 that is provided at the backmost position (position farthest from the top layer 3) in the thickness direction of the skin 1.

As described above, according to the fabric layer 5 of the skin 1 according to the present embodiment, the entire fabric layer 5 including the part positioned at the edge of the pore 5a is made of a fabric (strictly speaking, a tricot knitted fabric) constituted by urethane resin-impregnated fibers being knitted. As a result, strength is ensured around the pore 5a and fraying of fibers is effectively suppressed around the pore 5a.

The fabric layer 5 of the skin 1 according to the present embodiment and the other fabric layers (fabric layers of the comparative examples) different from the fabric layer 5 in terms of manufacturing conditions will be described in comparison with each other so that the above-described effects are described. Further, three types of fabric layers (Example 1, Example 2, and Example 3) will be given as the comparative examples. The specifications of each fabric layer (specifically, fiber knitting method, fiber type and thickness, basis weight and density of fabric, and presence or absence of urethane resin impregnation in fiber) are as illustrated in FIG. 4.

The fibers of the fabric constituting the fabric layer 5 of the skin 1 according to the present embodiment (hereinafter, fabric layer 5 of this example) are thicker than the fibers of the fabrics constituting the fabric layers of Example 1 and Example 2 as illustrated in FIG. 4. The fabric constituting the fabric layer 5 of this example is larger in basis weight than the fabric constituting the fabric layer of Example 1 as illustrated in FIG. 4. The fabric constituting the fabric layer 5 of this example is larger in density than the fabrics constituting the fabric layers of Example 1 and Example 2 as illustrated in FIG. 4. As illustrated in FIG. 4, none of the fibers of the fabrics constituting the fabric layers of Example 1 to Example 3 is urethane resin-impregnated whereas the fibers of the fabric constituting the fabric layer 5 of this example are urethane resin-impregnated. Furthermore, a plurality of pores are formed in each fabric layer.

As illustrated in FIG. 4, fraying of fibers around the pores is suppressed in the fabric layer 5 of this example whereas fraying of fibers around the pores occurs in the fabric layers of Example 1 to Example 3. As described above, in the fabric layer 5 of this example, the fibers constituting the fabric layer bottom portion 5b are in a raised state and are easily entangled. In combination with such a state, fraying of fibers around the pores is effectively suppressed in the fabric layer 5 of this example.

REFERENCE SIGNS LIST

1: SKIN
2: PORE
3: TOP LAYER
3a: PORE
4: FOAM LAYER
4a: PORE
5: FABRIC LAYER
5a: PORE
5b: FABRIC LAYER BOTTOM PORTION
10: AIR BLOWER
11: AIR DUCT
F: FRAME
P: CUSHION PAD
S: VEHICLE SEAT (CONVEYANCE SEAT)
S1: SEAT CUSHION
S2: SEAT BACK
S3: HEADREST
Sh: SEAT BODY

What is claimed is:

1. A method for manufacturing a conveyance seat, wherein
the conveyance seat includes a seat body on which an occupant can sit,
the seat body includes a skin that is provided with a top layer provided on a side of the skin facing the occupant in a thickness direction, a foam layer, and a fabric layer provided at a position on a side opposite to the top layer,
a plurality of pores are formed in each of the top layer, the foam layer and the fabric layer,
the pores through each layer communicate with each other and are in a straight line, a part of the fabric layer positioned at an edge of the pore is made of a resin-impregnated fabric,
the fabric layer has a fabric layer bottom portion provided at a position farthest from the top layer in the thickness direction, and
a fiber constituting the fabric layer bottom portion of the fabric layer in the skin is in a raised state, the method comprising:
providing the seat body; and
arranging the skin on a side of the seat body facing the occupant.

2. The method according to claim 1, wherein
the fabric layer is made of a fabric constituted by three types of fibers being knitted, and each type of the fiber has a different thickness.

3. The method according to claim 2, wherein the fabric layer is made of a tricot knitted fabric constituted by a plurality of types of fibers being knitted.

4. The method according to claim 1, wherein the top layer is made of synthetic leather made of polyvinyl chloride.

5. A method for manufacturing a conveyance seat, wherein
the conveyance seat includes a seat body on which an occupant can sit and an air blower attached to the seat body, the seat body includes a skin that is provided with a top layer provided on a side of the skin facing the occupant in a thickness direction, a foam layer, and a fabric layer provided at a position on a side opposite to the top layer, a plurality of pores allowing passage of a current of air generated by the air blower are formed in each of the top layer, the foam layer and the fabric layer, the pores through each layer communicate with each other and are in a straight line, a part of the fabric layer positioned at an edge of the pore is made of a resin-impregnated fabric, the fabric layer has a fabric layer bottom portion provided at a position farthest from the top layer in the thickness direction, and a fiber constituting the fabric layer bottom portion of the fabric layer in the skin is in a raised state, the method comprising:

providing the seat body;

attaching the air blower to the seat body; and arranging the skin on a side of the seat body facing the occupant.

6. The method according to claim 5, wherein the fabric layer is made of a fabric constituted by three types of fibers being knitted, and each type of the fiber has a different thickness.

7. The method according to claim 6, wherein the fabric layer is made of a tricot knitted fabric constituted by a plurality of types of fibers being knitted.

8. The method according to claim 5, wherein the top layer is made of synthetic leather made of polyvinyl chloride.

* * * * *